April 8, 1941.  J. A. PURVIS  2,237,501
WHEEL BALANCING DEVICE
Filed Feb. 7, 1940
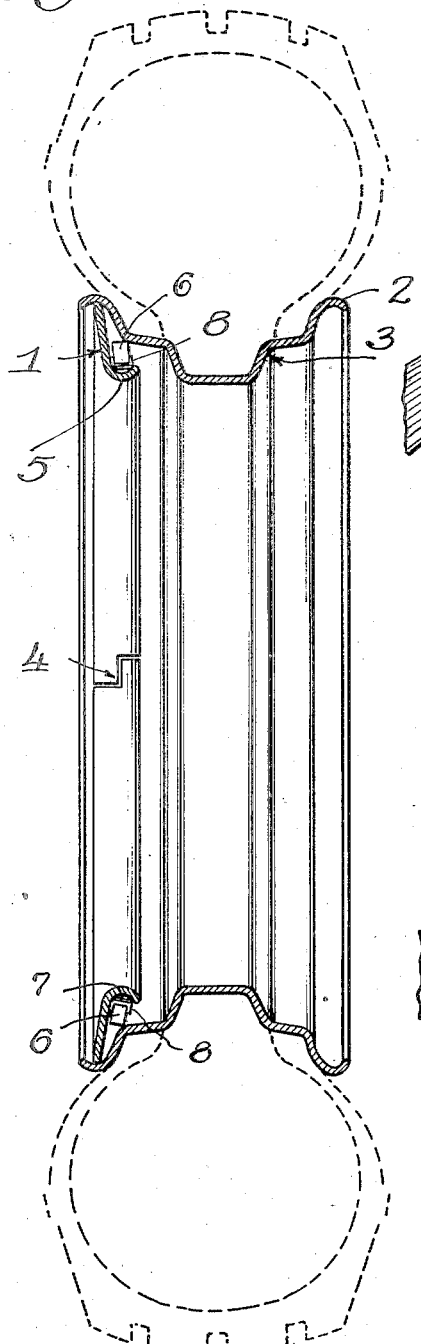
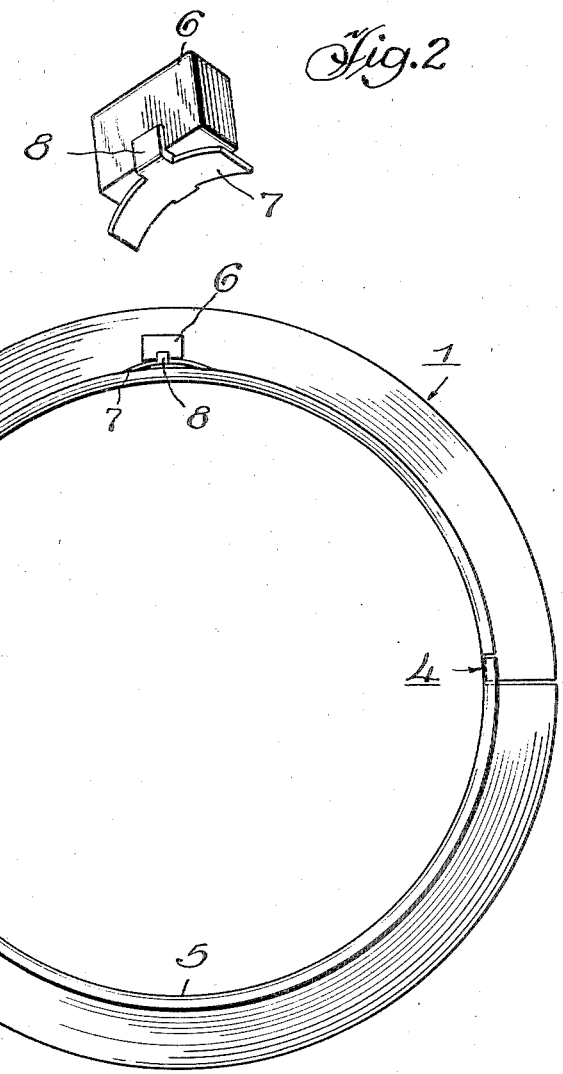

Patented Apr. 8, 1941

2,237,501

UNITED STATES PATENT OFFICE 2,237,501

WHEEL BALANCING DEVICE

Judson A. Purvis, Chicago, Ill.

Application February 7, 1940, Serial No. 317,732

4 Claims. (Cl. 301—5)

The present invention relates to wheel assemblies and more particularly to a novel wheel balancing device adapted to be detachably and adjustably mounted on the rim, and when in adjusted position, is held against displacement.

One of the serious objections to the present wheel assemblies for automobiles is that no provision is made for maintaining the wheels in dynamic and static balance while rotating at the relatively high speeds encountered in present day automobiles. In the past this balance has been less important due to lower road speeds and greater diameter wheels. However, with increased road speeds, the diameter of the wheels has decreased so that these wheels rotate at greatly increased speeds and set up centrifugal and gyroscopic forces interfering with the proper control and steering of the automobile, unless the wheel assemblies are equipped with means for maintaining them in dynamic and rotating balance.

As the wheel assemblies consist of a number of rotating parts such as tire, tube, wheel including the rim, hub and associated parts, and the brake drum, and any one or more of these may be out of balance, it will be readily appreciated that when the wheel assembly is rotating as a unit at high speeds, a serious condition of unbalance may exist. Such an unbalance may cause the wheel to wobble in a manner as to cause what is familiarly known as "shimmy" or "tramp," resulting in a loss of control by the operator, particularly if such unbalance exists in the front wheels.

Even though it is possible to balance the wheel parts by the manufacturer, the addition of the tire and tube may offset this balance. Furthermore, although the entire assembly may be balanced when originally purchased, removal and replacement of the tire and tube or the wheel which is retained on the hub by a plurality of spaced bolts, may offset this balance and each time one of these parts is removed and replaced, or a new part is substituted therefor, the balance is affected. As the tire and tube are farthest removed from the center of rotation, they create more force with a smaller amount of unbalance than the parts nearer the hub. Any uneven wear on the tire will greatly affect the state of balance and may quickly throw the assembly out of balance. Such balance must be maintained within extremely close limits, and as a practical proposition, it is commercially impossible for the manufacturer to maintain such balance.

The present invention comprehends a novel balancing device which may be quickly and easily installed either as original or standard equipment, or may be subsequently installed as an attachment. It requires no fastening means, and when installed, provides a highly ornamental ring which completely encloses and retains spaced adjustable balancing weights. This assembly may be quickly installed on the rim of any standard wheel assembly, and as quickly removed, whenever the occasion arises. However, it will be appreciated that the weights may be quickly adjusted when the ring is in position in view of the spacing between the rear edge of the ring and the rim.

In the preferred embodiment, the invention comprises a snap ring having complementary meeting edges so contoured as to retain the joint aligned under operating conditions, and spaced detachable and adjustable weights held in predetermined position in the ring by spring tension, unaffected by centrifugal force. The ring is so located with respect to the tire and rim that there is no danger of accidental displacement or removal.

Further objects, advantages and capabilities will be apparent from the detailed disclosure or are inherent in the device.

In the drawing:

Fig. 1 is a view in vertical cross section through an automobile rim equipped with the novel balancing device, the tire being shown in dotted outline.

Fig. 2 is a view in perspective of one of the balancing weights and its clamping spring.

Fig. 3 is a fragmentary view in side elevation of the rear of the snap ring and showing one of the balancing weights in position.

Referring more particularly to the disclosure in the drawing, the embodiment therein illustrated comprises a split snap ring 1 adapted to be mounted or anchored in a curved flange 2 of a standard rim 3, with the ring having its ends stepped or contoured at 4 so as to maintain alignment at the joint. This snap ring is preferably inclined or tilted inwardly and provided with an inwardly projecting arcuate portion or flange 5 adapted to receive spaced balancing weights 6. These balancing weights may be of any suitable metal such as lead or other metal of desired weight and may further be of any desired shape, although good results are secured by making them of substantially rectangular form.

In order to retain these weights in their adjusted and balancing position, the invention comprehends a spring clip 7 having projecting flanges 8, 8 which grip the opposite side of each weight and hold it against a portion of the rim 3. Any desired number of the weights and spring clips may be spaced about the interior of the snap ring. Also, although I have shown a snap ring on but one and preferably the outer side of the rim, such a ring may be placed on either or both sides of the rim, as desired or required to balance the wheel assembly.

The snap ring is preferably of light gauge metal of sufficient tension to hold the ring firmly inside the rim. However, it is possible to construct such a ring of a plastic material having sufficient inherent resiliency as to be retained in the rim. Although the weights are shown as maintained in predetermined, adjusted position by means of a spring, it will be appreciated that any suitable means may be provided for holding the weights in position in the channel in the snap ring, including dispensing with the spring and retaining these weights clamped between the rim and channel of the retaining ring.

Having thus disclosed the invention, I claim:

1. In a wheel assembly for automobiles, a rim therefor provided on its opposite sides with an outwardly turned flange forming a radially inwardly opening continuous channel, a snap ring adapted to be detachably mounted within said channel and provided with a generally axially projecting flange, and balancing weights carried by the snap ring and clamped between the flange on the ring and a portion of the rim in such manner as to prevent their accidental displacement.

2. In a balanced wheel assembly for automobiles, including the tire and a rim provided with an outwardly turned flange forming a radially inwardly opening continuous channel, a snap ring adapted to be detachably mounted within the circumference of the rim and anchored in said channel, a generally axially turned flange at the inner edge of the ring, and spaced balancing weights adapted to be mounted within the ring and firmly clamped between said ring and a portion of the rim.

3. In a balanced wheel assembly for automobiles, including the tire and a rim provided with an outwardly curved flange forming a radially inwardly opening channel, a ring adapted to be detachably mounted within said channel but having sufficient inherent resiliency to be retained firmly in anchored position, a generally axially curved flange on said ring, spaced balancing weights adapted to be carried within said ring, and spring clips for tensionally retaining the weights between the flange on the ring and the body of the rim.

4. In a balanced wheel assembly for automobiles, including the tire and a rim provided with an outwardly turned flange forming a radially inwardly opening continuous channel, a snap ring adapted to be detachably mounted within the circumference of the rim and anchored in said channel, a generally axially turned flange at the inner edge of the ring, spaced balancing weights adapted to be mounted within the ring and between it and the rim, and means for tensionally retaining these weights against accidental displacement but permitting their ready removal or adjustment when the occasion arises.

JUDSON A. PURVIS.